United States Patent
Skipper

(10) Patent No.: US 9,491,705 B2
(45) Date of Patent: Nov. 8, 2016

(54) RADIO FREQUENCY METHOD FOR RECHARGING A WIRELESS TELEPHONE

(71) Applicant: Jonathan W. Skipper, Elm Grove, WI (US)

(72) Inventor: Jonathan W. Skipper, Elm Grove, WI (US)

(*) Notice: Subject to any disclaimer, the term of this patent is extended or adjusted under 35 U.S.C. 154(b) by 287 days.

(21) Appl. No.: 13/955,104

(22) Filed: Jul. 31, 2013

(65) Prior Publication Data
US 2015/0038197 A1    Feb. 5, 2015

(51) Int. Cl.
| H04B 1/38 | (2015.01) |
| H04W 52/02 | (2009.01) |
| H02J 17/00 | (2006.01) |
| H02J 7/00 | (2006.01) |

(52) U.S. Cl.
CPC .......... *H04W 52/0251* (2013.01); *H02J 17/00* (2013.01); *H04W 52/0245* (2013.01); *H02J 7/0047* (2013.01); *H02J 7/0077* (2013.01); *H02J 2007/0096* (2013.01)

(58) Field of Classification Search
USPC ...... 455/550.1, 556.1, 557, 41.1, 41.2, 41.3, 455/572, 573, 343.1–343.6
See application file for complete search history.

(56) References Cited

U.S. PATENT DOCUMENTS

| 6,928,309 B2* | 8/2005 | Jinnouchi | H04B 1/3888 455/344 |
| 8,344,689 B2 | 1/2013 | Boguslavskij | |
| 2008/0268897 A1* | 10/2008 | Seier | H04M 1/72516 455/550.1 |
| 2010/0034238 A1* | 2/2010 | Bennett | H02J 5/005 375/130 |
| 2011/0215756 A1 | 9/2011 | Shimizu | |
| 2012/0189146 A1 | 7/2012 | Wuidart | |
| 2013/0065649 A1 | 3/2013 | Kong et al. | |
| 2013/0154381 A1* | 6/2013 | Cain | H02J 17/00 307/104 |
| 2013/0241308 A1 | 9/2013 | Bilbrey et al. | |
| 2013/0264998 A1* | 10/2013 | Schul | H02J 7/0047 320/107 |
| 2014/0074185 A1* | 3/2014 | Fell | A61N 1/3787 607/61 |
| 2014/0191712 A1* | 7/2014 | Rea | H02J 17/00 320/108 |

FOREIGN PATENT DOCUMENTS

EP    2151906 A2 *  2/2010  ............. H02J 5/005

* cited by examiner

*Primary Examiner* — Fayyaz Alam
(74) *Attorney, Agent, or Firm* — Quarles & Brady LLP

(57) ABSTRACT

When the charge of a battery in a mobile telephone is less than a predefined level, a recharge request message or notice is wirelessly transmitted to a charging module. In response, the charging module begins transmitting a radio frequency signal. The mobile telephone receives the radio frequency signal and extracts energy therefrom which is used to recharge the battery. When the charge of the battery is greater than a predetermined level, recharging the battery terminates and a termination message is wirelessly transmitted to the charging module, which responds by discontinuing transmission of the radio frequency signal.

10 Claims, 2 Drawing Sheets

RADIO FREQUENCY METHOD FOR RECHARGING A WIRELESS TELEPHONE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to wireless telephones, such as cellular telephones and smart phones, that communicate wirelessly to the communication network, and more particularly to techniques for recharging the battery or other power source in such telephones.

2. Description of the Related Art

Cellular telephones are portable, battery powered communication devices in which the battery periodically requires recharging. Recharging is typically accomplished using a charging module that is plugged into a standard electrical outlet. An electrical cord from the charging module is plugged into a connector on the cellular telephone. The cellular telephone remains tethered to the charging module for a period of time, the length of which depends upon the extent to which the battery was depleted. During that time period, the electrical cord limits the extent to which the telephone can be moved with respect to the charging module.

During recharging the cellular telephone may be used for communication purposes. It is desirable to enable a cellular telephone to be recharged without being tethered to a charging module. Doing so will permit the telephone to be moved a greater distance away from the charging module and thus facilitate its continued use for communication purposes.

SUMMARY OF THE INVENTION

A battery in a mobile telephone is recharged by activating a charging module to transmit a radio frequency signal. The mobile telephone receives the radio frequency signal and extracts energy from that signal. The extracted energy is used to electrically recharge the battery.

In one aspect of the present invention, the state of charge of the battery is monitored. When the state of charge is less than a first predefined level, a recharge request message is transmitted wirelessly from the mobile telephone. The charging module responds to receiving the recharge request message by transmitting the radio frequency signal.

In a further aspect, the charging module responds to receiving the recharge request message by wirelessly transmitting an acknowledgement message. The mobile telephone responds to the acknowledgement message by commencing to recharge the battery.

In yet another aspect of the present invention, the mobile telephone monitors the state of charge of the battery while the battery is being recharged. When the state of charge is greater than a second predefined level, the mobile telephone terminates recharging the battery and wirelessly transmits a recharge termination message. The charging module responds to receiving the recharge termination message by ceasing to transmit the radio frequency signal.

DETAILED DESCRIPTION OF THE INVENTION

Figure 1:
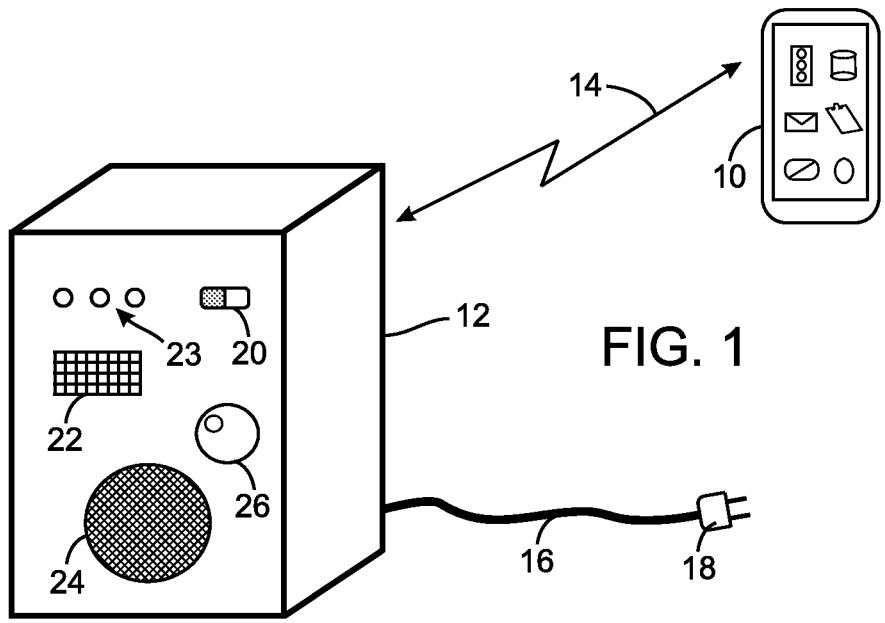
FIG. 1 illustrates a battery charging module being used to recharge the battery of a cellular telephone.

FIG. 1 illustrates a mobile telephone 10 which as used herein refers to a device, such as a cellular telephone or a "smart phone", that is capable of communicating wirelessly with a communication network. The mobile telephone 10 is recharged by a radio frequency signal 14 transmitted from a charging module 12. The charging module receives electrical power via a cable 16 that has a plug 18 for insertion into a standard electrical outlet in a building. The charging module 12 utilizes the power received from the cable 16 to transmit the radio frequency signal 14.

The charging module 12 has an on/off switch 20 and an audio annunicator 22 that is any one of several well known devices that emits one or more tones or sound patterns in response to electrical control signals. The charging module 12 also includes an audio speaker 24 and a volume control 26 for playing music or other audio material, as will be described.

Figure 2:
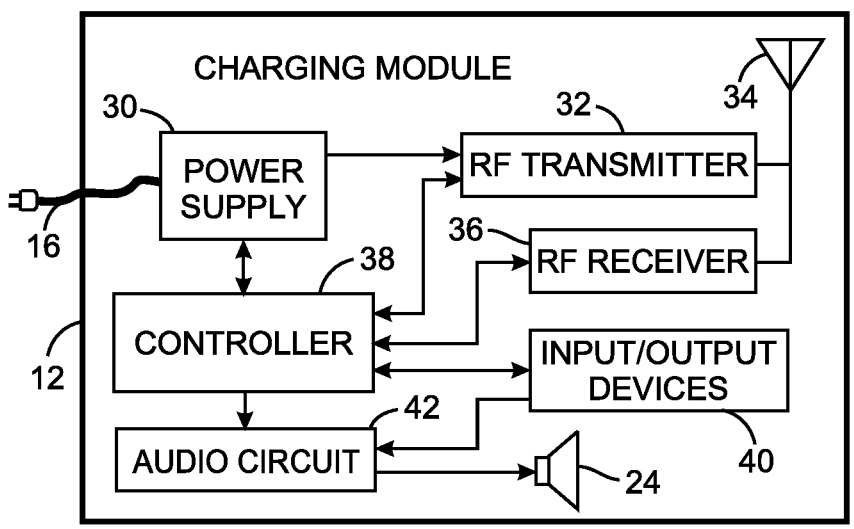
FIG. 2 is a block schematic diagram of the electronic circuitry for the charging module.

Referring to FIG. 2, the electrical cable 16 is connected to a power supply 30 within the charging module 12. The power supply 30 is furnishes electrical energy to a conventional transmitter 32 that emits a radio frequency signal via antenna 34. That signal is in the radio frequency range so as to be receivable by the mobile telephone 10, however the frequency may be different from radio frequencies used by the mobile telephone for communication purposes. The antenna 34 also is connected to a radio frequency signal receiver 36.

Both the transmitter 32 and the receiver 36 are connected to a controller 38 that may be a conventional microcomputer based device which includes input/output circuits and a memory for storing a software program that governs the operation of the charging module 12. The memory also provides storage locations for data used by the software program. The controller 38 is connected to the input/output devices 40 of the charging module which include the on/off switch 20, the annunicator 22, and indicator lights 23. The volume control 26 of the input/output devices 40 is connected to an audio circuit 42 that has an output connected to the speaker 24. The audio circuit 42 may be a broadcast radio receiver, a port for a media player such as an iPod®, or another source of audio material.

Figure 3:
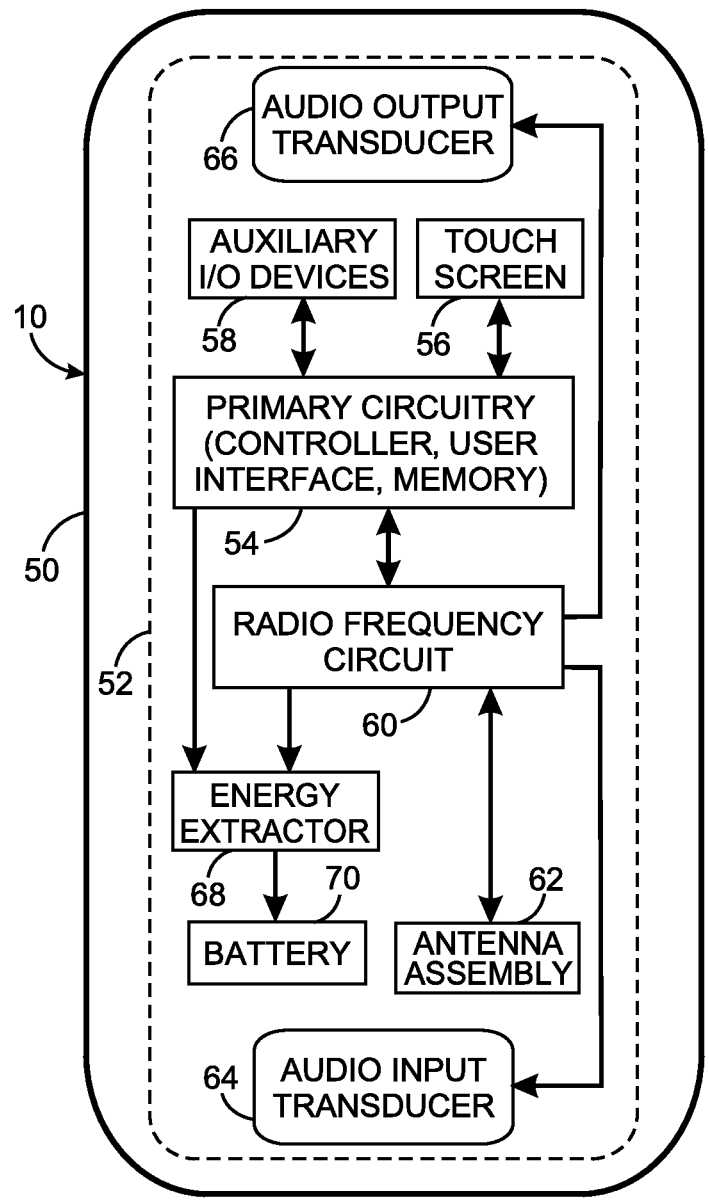
FIG. 3 is a block schematic diagram of the electronic circuitry in the cellular telephone.

With reference to FIG. 3, the mobile telephone 10 illustratively includes a housing 50, which can be a static, a flip or sliding type housing commonly used for cellular telephones. Nevertheless, other housing configurations also may be used.

The housing 50 contains a main dielectric substrate 52, such as a printed circuit board substrate, on which is mounted the primary circuitry 54. That primary circuitry 54, typically includes a microprocessor 55 a random access memory and a non-volatile memory. A touch screen 56 provides a user interface for controlling the mobile telephone. A keypad also may be provided. An audio input transducer 64, such as a microphone, and an audio output transducer 66, such as a speaker, function as an audio interface to the user and are connected to the primary circuitry 54.

Interaction with an external communication network is performed through a radio frequency circuit 60 which includes a digital signal processor, a wireless signal receiver and a wireless signal transmitter that are connected to a multiple frequency band antenna 62. The antenna 62 is carried within the lower portion of the housing 50. The specific design and implementation of the radio frequency circuit 60 depends upon the communication network in which the mobile telephone 10 is intended to operate. For example, a device destined for use in North America may be designed to operate within the Mobitex™ mobile communication system or DataTAC™ mobile communication system, whereas a device intended for use in Europe may incorporate a General Packet Radio Service (GPRS) communication subsystem.

A battery 70 is carried within the housing 50 for supplying power to the internal components. An energy extractor 68 uses the radio frequency signal received by the mobile telephone 10 to recharge the battery 70, as will be described in greater detail.

The mobile telephone 10 also may comprise an auxiliary input/output devices 58, such as, for example, a WLAN (e.g., Bluetooth®, IEEE. 802.11) antenna assembly and circuits for WLAN communication capabilities, and/or a satellite positioning system (e.g., GPS, Galileo, etc.) receiver and antenna assembly to provide position location capabilities, as will be appreciated by those skilled in the art. Other examples of auxiliary I/O devices 58 include an electronic camera for imaging capabilities, and an electrical device connector such as for a USB device, a headphone, or a memory card.

With continuing reference to FIG. 3, the primary circuitry 54 is connected to the power terminals of the battery 70 and periodically senses the voltage across those terminals. That sensing enables the primary circuitry to determine the relative state of charge of the telephone battery. In addition to having a continuous battery level indicator, at several predefined battery charge levels, such as 25%, 50%, 75% and 100% of full charge, the primary circuitry 54 produces an indication of that charge level on the touch screen 56 of the telephone 10. This notifies the user when the telephone requires recharging and when the recharging process has been completed, i.e., the battery is 100% charged.

When the primary circuitry 54 determines that the battery is below 25% of the full charge level, a command is sent to the radio frequency circuit 60 causing that latter component to send a recharge request message via a radio frequency signal that can be received by the charging module 12. Specifically, the transmitter within the radio frequency circuit 60 is tuned by the primary circuitry 54 to the frequency of the charging module 12. The radio frequency circuit produces a carrier signal at that radio frequency (RF) and modulates the carrier signal with a message that indicates that the mobile telephone requires recharging. The modulated RF signal is applied to the multiple frequency band antenna 62. The mobile telephone 10 intermittently transmits this recharge request signal until receiving a response from a charging module 12.

When the mobile telephone 10 is proximate to a charging module 12, the recharge request signal will be received by the antenna 34 of the charging module, shown in FIG. 2. That signal will be detected by the charging module's receiver 36 which conveys the recharge request message modulated on that signal to the controller 38. The controller recognizes the recharge request message and responds by sending an acknowledgement message to the transmitter 32 of the charging module. That action causes the transmitter 32 to apply the acknowledgement message to a radio frequency signal that is continuously transmitted via the antenna 34 to the mobile telephone 10. That signal, designated the recharging radio frequency signal, is relatively intense, thereby carrying sizeable amount of RF energy derived from the power supply 30.

While that intense radio frequency signal is being transmitted, the audio circuit 42 in the charging module 12 plays music or other audio material through speaker 24, thereby indicating that recharging is taking place.

Upon receiving the acknowledgement signal, circuitry of the telephone 10 in FIG. 3 enters the battery recharging mode. Specifically, the radio frequency circuit 60 receives the RF signal carrying the acknowledgement message and forwards that message to the primary circuitry 54. The primary circuitry 54 recognizes the message and in response commences the recharging mode. In that mode, the primary circuitry 54 activates the energy extractor 68 to process the incoming radio frequency signal and derives electrical energy therefrom. The energy extractor 68 uses that electrical energy to apply a charging voltage to the battery 70, thereby recharging the battery.

While recharging is occurring, the primary circuitry 54 periodically suspends the action of the energy extractor 68 long enough for the primary circuitry to detect the voltage, and thus the state of charge, of the battery 70. At various charge levels, such as 50%, 75%, and 100% of the fully charged level, an indication of that charge level is displayed on the touch screen 56. In addition, different tones or sound patterns can be emitted by the audio output transducer 66 to indicate the present charge level to the user.

In the recharging mode, the radio frequency circuit 60 in the mobile telephone 10 monitors the strength of the radio frequency recharging signal. Should the strength of that signal drop below a predefined level, as may occur if the mobile telephone is moved a significant distance away from the charging module 12, the radio frequency circuit provides an indication of that event to the primary circuitry 54. The primary circuitry 54 responds by displaying a low signal strength indication on the touch screen 56 and applying a warning tone to the audio output transducer 66. This alerts to the user, that the mobile telephone 10 has been moved relatively far from the charging module 12 for satisfactory recharging to take place.

The strength of the received radio frequency recharging signal dropping below the predefined level also causes the primary circuitry 54 to formulate a low charging signal strength message. The radio frequency circuit 60 transmits that message from the mobile telephone 10 to the charging module 12. The receiver 36 within the charging module in FIG. 2 decodes and forwards that low charging signal strength message to the controller 38. The controller 38 may respond by increasing the signal strength of recharging radio frequency signal being transmitted. Alternatively, if the recharging radio frequency signal cannot be intensified, the charging module may suspend operation providing an indication of that event via lights 23 and the annunciator 22. Those indications will further alert the user that the phone is farther from the charging module 12 than is desired for proper recharging of the battery 70.

Eventually the battery 70 becomes fully recharged, which state is detected by the primary circuitry 54. This event causes the primary circuitry 54 to terminate the recharging mode and disable further operation of the energy extractor. At this juncture, the primary circuitry 54 sends a recharge termination message to the radio frequency circuit 60 which applies that message to a radio frequency signal that is sent via the antenna 62 to the charging module 12.

Upon receiving the radio frequency signal with the recharge termination message, the receiver 36 within the charging module 12 decodes and conveys that message to the controller 38. The controller 38 responds by commanding the transmitter 32 to cease transmitting the recharging radio frequency signal. Termination of the charging operation is then designated by one of the indicators 23 for perception by the user of the cell phone. The charged termination message also causes the controller 38 to turn off the audio circuit 42 playing of audio material, which further indicates to the user that the telephone has become fully charged. Thereafter, the charging module commences a standby mode in which it continues to listen for another recharge request radio frequency signal from the same or a different mobile telephone.

The foregoing description was primarily directed to one or more embodiments of the invention. Although some attention has been given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for charging a battery in a mobile telephone comprising:
    monitoring a state of charge of the battery;
    when the state of charge is less than a first predefined level, wirelessly transmitting a recharge request message from the mobile telephone wherein the recharge request message is a first radio frequency signal;
    activating a charging module to transmit a second radio frequency signal in response to the charging module receiving the recharge request message;
    receiving the second radio frequency signal at the mobile telephone;
    extracting energy from the second radio frequency signal that is received; and
    employing the energy to recharge the battery and, while employing the energy to recharge the battery, further performing the steps of:
        measuring a strength of the second radio frequency signal using the mobile telephone and, in response to the strength of the second radio frequency signal being less than a predetermined level, wirelessly transmitting a low charging signal strength message from the mobile telephone;
        receiving the low charging signal strength message at the charging module which responds to the low charging signal strength message by increasing an intensity of the second radio frequency signal being transmitted; and
        playing audio material through a speaker of the charging module while the charging module transmits the second radio frequency signal, thereby indicating that recharging is taking place.

2. The method as recited in claim 1 further comprising the charging module further responding to receiving the recharge request message by wirelessly transmitting an acknowledgement message.

3. The method as recited in claim 2 further comprising the mobile telephone responding to the acknowledgement message by commencing to recharge the battery.

4. The method as recited in claim 1 further comprising, after transmitting the recharge request message, the mobile telephone awaits receipt of the second radio frequency signal, and upon that receipt, the mobile telephone commences recharging the battery.

5. The method as recited in claim 1 further comprising:
    after employing the energy to recharge the battery has commenced, monitoring a state of charge of the battery; and
    when the state of charge is greater than a second predefined level, wirelessly transmitting a recharge termination message from the mobile telephone.

6. The method as recited in claim 5 further comprising the charging module responding to receiving the recharge termination message by ceasing to transmit the second radio frequency signal.

7. The method as recited in claim 1 further comprising while employing the energy to recharge the battery:
    the mobile telephone measuring strength of the second radio frequency signal;
    in response to the strength of the second radio frequency signal being less than a predetermined level, the mobile telephone providing a human perceptible warning.

8. The method as recited in claim 1 further comprising:
    monitoring state of charge of the battery; and
    the mobile telephone providing a human perceptible indication of the state of charge of the battery.

9. The method as recited in claim 1 further comprising emitting a sound pattern from an audio output transmitter of the mobile telephone to indicate a present charge level to the user.

10. The method as recited in claim 1 further comprising emitting a tone from an audio output transmitter of the mobile telephone to indicate a present charge level to the user.

* * * * *